(No Model.)
D. R. PROCTOR.
SAW.
No. 361,238. Patented Apr. 12, 1887.
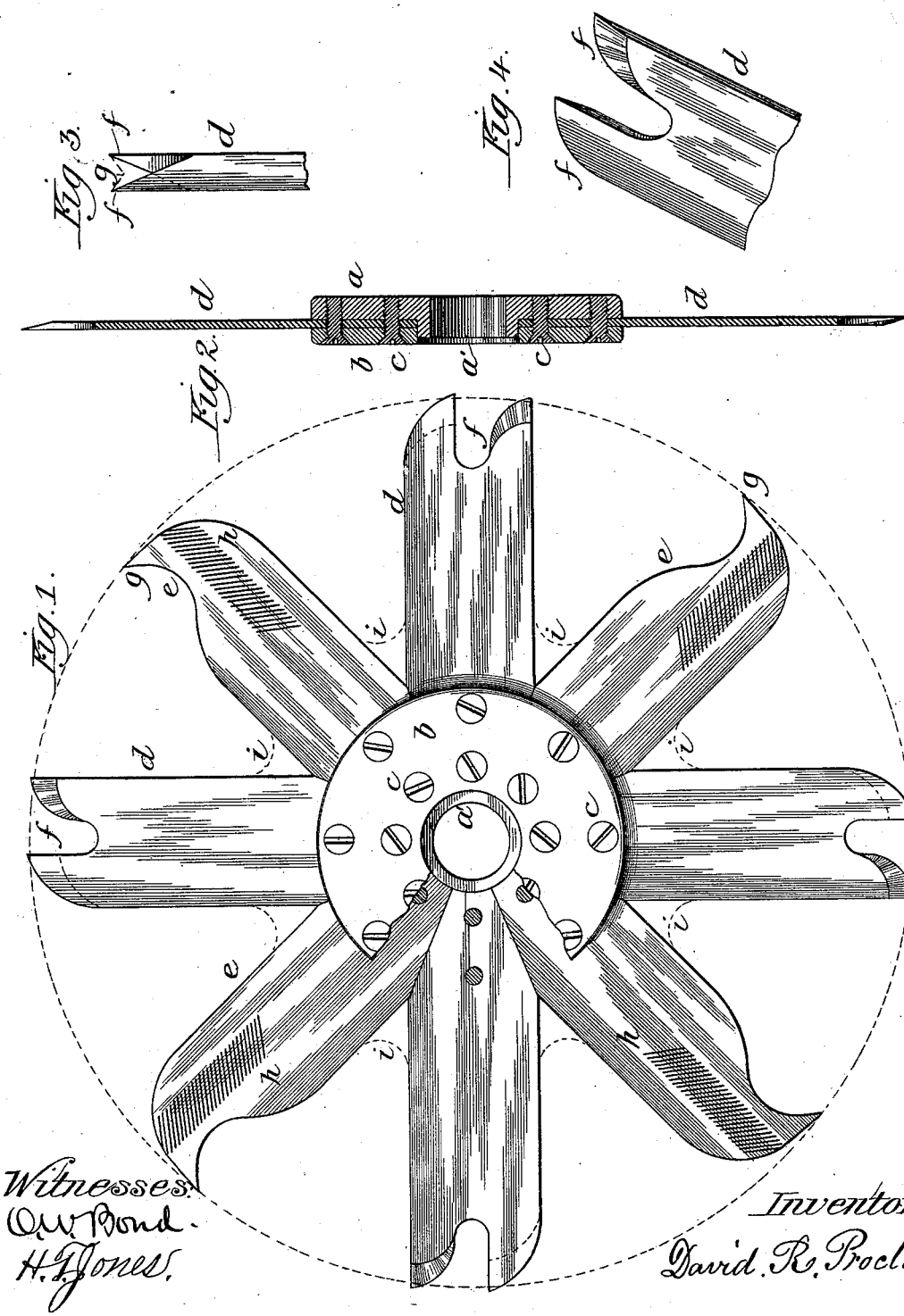
Witnesses:
O.W. Bond.
H.T. Jones.
Inventor:
David R. Proctor

UNITED STATES PATENT OFFICE.

DAVID R. PROCTOR, OF CHICAGO, ILLINOIS, ASSIGNOR TO HIMSELF AND JAMES F. MARSHALL, OF SAME PLACE.

SAW.

SPECIFICATION forming part of Letters Patent No. 361,238, dated April 12, 1887.

Application filed May 25, 1886. Serial No. 203,260. (No model.)

*To all whom it may concern:*

Be it known that I, DAVID R. PROCTOR, residing at Chicago, in the county of Cook and State of Illinois, and a citizen of the United States, have invented a new and useful Improvement in Saws, of which the following is a full description, reference being had to the accompanying drawings, in which—

Figure 1 is an elevation with the arbor partly broken away; Fig. 2, a cross-section; Figs. 3 and 4, views of the cutting-teeth enlarged.

The object of this invention is to produce a circular saw which will cut smoothly and rapidly, and which will not heat in use; and its nature consists in the improvements hereinafter described and claimed as new.

In the drawings, $a\ a'$ indicate the face-plate of the arbor; $b$, the cap-plate; $c$, screws; $d$, cutting-blades; $e$, grooving-blades; $f$, cutting-point; $g$, grooving-points; $h$, roughened parts on the saw-blades.

The arbor $a\ b$ is made of cast or other suitable iron, and the base $a$ is provided with a hollow projection or collar, $a'$, through which the arbor-shaft or mandrel passes and against which the ends of the saw-blades are made to fit, as shown in Fig. 1. The cap-plate $b$ fits snugly over this collar, and is attached to the base by means of the screws $c$, which pass through it and the saw-blades and into the base-plate, so as to clamp and hold all of the parts firmly together.

The inner ends of the blades are concaved to fit against the collar $a'$ and beveled off at their edges, so as to fit snugly and firmly against each other, as shown in Fig. 1. These blades are arranged to stand radially from the arbor, and the blades $d$ are provided with cutting-edges, which are separated, so that either side may be easily sharpened, and are beveled at the inner sides, as shown. These cutting-edges are easily formed and easily kept sharp, as they may be sharpened by grinding or by filing, as may be most convenient.

The blades $e$ have their outer ends provided with a grooving-tooth, $g$, as shown, which tooth is flat or chisel-pointed, so as to groove out the material separated by the cutters. The cutters $b$ project slightly beyond the groovers $g$, as shown by the circular line in Fig. 1. The cutters $f$ may have a slight set, if desired; but if the cutting-edges are not beveled off or allowed to be worn down upon the outside, setting will not be necessary.

The side surfaces of the blades $e$ are roughened, as shown at $h$, by a file-cutter, which gives a smoothing-surface to such blades as are so roughened. This feature is especially desirable in crosscutting seasoned lumber, as it gives the cut a smooth fine finish. For ripping or ordinary sawing in seasoned lumber, they are also desirable for smoothing the kerf; but for such sawing they may be omitted, as I do not limit the other features of my improvement to their use in combination with this roughing $h$.

The blades $d\ e$ are consecutively numbered around the saw, and the arbor correspondingly numbered, so that in case of breakage or injury the damaged blade can be replaced, and also so that if for any purpose the saw is taken apart the blades can be properly replaced. The arbor is also properly turned or finished, so that when the cutting-blades are applied they will form in a true plane without bending or shaping them.

In a saw formed in this manner the spaces between the blades or operating parts form air-spaces, which have a fan effect, and keep the saw cool under all circumstances to which a saw is properly subjected, and by this arrangement the saw is easily repaired in parts in case of breakage or accident, is easily kept in running order, and effective in its operation.

I have described my improved saw in what I consider its best form; but it is evident that the saw-blades may be formed of a single plate, cut away, as indicated by the dotted lines $i$ in Fig. 1, or so that the blades $d\ e$ will be integral at their inner ends, and that when so made they may be attached to the arbor in the usual manner. The grooving-teeth may also be made V-shaped, as shown at $g$ in Fig. 3, instead of being square or chisel-pointed, which may be more desirable for some purposes.

I do not claim, broadly, the application of a smoothing-surface to the sides of a saw-blade, as that is shown in Patent No. 118,800, on a jig or scroll saw. A roughened surface suited to such a saw would not be adapted to a circular saw which runs continuously in one direction and requiring a clearing-space to free the saw from the dust. By making the smoothing edges or projections continuous and inclining their backward ends downward, a complete smoothing-surface for a circular saw is formed, with spaces between the ridges for the discharge of the dust.

What I claim as new, and desire to secure by Letters Patent, is—

1. A circular saw having its acting-rim composed of radial cutting-blades $d$ and radial grooving-blades $e$, alternating with and supporting each other, and provided with intervening spaces located between the outer ends of said blades, substantially as described.

2. The roughened smoothing-surface $h$, formed of downwardly and rearwardly inclined projections or smoothers, in combination with the circular saw formed of separate radial blades, substantially as set forth.

DAVID R. PROCTOR.

Witnesses:
O. W. BOND,
HARRY T. JONES.